(12) United States Patent
Stathopoulos et al.

(10) Patent No.: US 8,798,086 B2
(45) Date of Patent: Aug. 5, 2014

(54) TIME-PRESERVED TRANSMISSIONS IN ASYNCHRONOUS VIRTUAL MACHINE REPLICATION

(75) Inventors: Thanos Stathopoulos, Jersey City, NJ (US); Pramod Koppol, Manalapan, NJ (US); Kedar Namjoshi, Basking Ridge, NJ (US); Gordon Wilfong, Bedminster, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 175 days.

(21) Appl. No.: 13/241,699

(22) Filed: Sep. 23, 2011

(65) Prior Publication Data
US 2013/0077636 A1   Mar. 28, 2013

(51) Int. Cl.
| | | |
|---|---|---|
| *H04L 12/861* | (2013.01) | |
| *H04L 12/801* | (2013.01) | |
| *H04L 12/54* | (2013.01) | |
| *H04L 12/879* | (2013.01) | |
| *H04Q 11/04* | (2006.01) | |
| *H04L 12/56* | (2006.01) | |

(52) U.S. Cl.
CPC ............... *H04L 49/90* (2013.01); *H04L 47/10* (2013.01); *H04L 12/5693* (2013.01); *H04L 49/901* (2013.01); *H04Q 11/0478* (2013.01)
USPC ......................................................... 370/412

(58) Field of Classification Search
CPC ..... H04L 49/90; H04L 47/10; H04L 12/5693; H04L 49/901; H04Q 11/047
See application file for complete search history.

(56) References Cited

U.S. PATENT DOCUMENTS

| | | | |
|---|---|---|---|
| 6,360,271 B1* | 3/2002 | Schuster et al. | 709/231 |
| 6,683,885 B1* | 1/2004 | Sugai et al. | 370/423 |
| 6,907,469 B1* | 6/2005 | Gallo et al. | 709/238 |
| 8,239,526 B2* | 8/2012 | Simpson et al. | 709/224 |
| 8,341,732 B2* | 12/2012 | Croft et al. | 726/21 |
| 8,355,407 B2* | 1/2013 | Wookey et al. | 370/401 |
| 8,392,562 B2* | 3/2013 | Rajan et al. | 709/225 |
| 8,521,884 B2* | 8/2013 | Hsu et al. | 709/226 |
| 2007/0198656 A1* | 8/2007 | Mazzaferri et al. | 709/218 |
| 2008/0008202 A1* | 1/2008 | Terrell et al. | 370/401 |
| 2010/0325257 A1* | 12/2010 | Goel et al. | 709/223 |
| 2011/0164502 A1* | 7/2011 | Mohan et al. | 370/236.2 |
| 2012/0063345 A1* | 3/2012 | Krzanowski et al. | 370/252 |
| 2012/0226804 A1* | 9/2012 | Raja et al. | 709/224 |
| 2012/0233668 A1* | 9/2012 | Leafe et al. | 726/4 |
| 2012/0311575 A1* | 12/2012 | Song | 718/1 |
| 2013/0018939 A1* | 1/2013 | Chawla et al. | 709/203 |
| 2013/0022051 A1* | 1/2013 | Suganthi et al. | 370/400 |
| 2013/0086250 A1* | 4/2013 | Eskicioglu et al. | 709/224 |
| 2013/0182701 A1* | 7/2013 | Johan et al. | 370/352 |

OTHER PUBLICATIONS

Brendan Cully, Geoffrey Lefebvre, Dutch Meyer, Mike Feeley, Norm Hutchinson, and Andrew Warfield, "Remus: High Availability via Asynchronous Virtual Machine Replication", USENIX NSDI 2008, pp. 161-174 of the Proceedings, The Advanced Computing Systems Association, Conference Apr. 16-18, 2008.*

(Continued)

*Primary Examiner* — Andrew Lai
*Assistant Examiner* — Hoyet H Andrews
(74) *Attorney, Agent, or Firm* — Harness, Dickey & Pierce (57) ABSTRACT

The method includes determining a timestamp corresponding to a received data packet associated with the virtual machine and releasing the data packet from a buffer based on the timestamp and a time another data packet is released from the buffer.

12 Claims, 4 Drawing Sheets

(56) References Cited

OTHER PUBLICATIONS

Zagorodnov, D., Marzullo, K., Alvisi, L., and Bressoud, T. C. 2009. Practical and low-overhead masking of failures of TCP-based servers. ACM Trans. Comput. Syst. 27, 2, Article 4 (May 2009), 39 pages. DOI = 10.1145/1534909.1534911 http://doi.acm.org/10.1145/1534909.1534911.*

"Toward a Cloud Operating System", Pianese, F. ; Bosch, P. ; Duminuco, A. ; Janssens, N. ; Stathopoulos, T. ; Steiner, M., Network Operations and Management Symposium Workshops (NOMS Wksps), 2010 IEEE/IFIP, Digital Object Identifier: 10.1109/NOMSW.2010.5486552, Publication Year: 2010 , pp. 335-342).*

Liu, Haikun, Jin, Hai, Liao, Xiaofei, Yu, Chen, Xu, Cheng-Zhong, "Live Virtual Machine Migration via Asynchronous Replication and State Synchronization", IEEE Transactions on Parallel & Distributed Systems. Dec. 2011, vol. 22 Issue 12, p. 1986-1999.*

Zagorodnov, D., Marzullo, K., Alvisi, L., and Bressoud, T. C. 2009, "Practical and low-overhead masking of failures of TCP-based servers", ACM Trans. Comput. Syst. 27, 2, Article 4 (May 2009), 39 pages. DOI = 10.1145/1534909.1534911 http://doi.acm.org/10.1145/ 1534909.1534911 a system called fault-tolerant TCP (FT-TCP).*

* cited by examiner

TIME-PRESERVED TRANSMISSIONS IN ASYNCHRONOUS VIRTUAL MACHINE REPLICATION

FIELD OF THE INVENTION

Embodiments relate to time preserving packet transmissions during asynchronous replication of virtual machines.

BACKGROUND OF THE INVENTION

Virtualization of a computing infrastructure such as that used for offering telephone communications services involves offering such services over a computing environment.

Virtualization may include the use of physical machines, servers and virtual machines. A physical machine or a server is a physical entity. A virtual machine includes software executing on a physical machine which emulates an independent and separate machine from other virtual machines which may be emulated on the same physical machine. A single physical machine may host multiple virtual machines. The term "server" may refer to either a physical machine or a virtual machine, based on context.

Virtual machines may be replicated using one of two methods. One is Synchronous Virtual Machine Replication and a second is Asynchronous Virtual Machine Replication. Synchronous Virtual Machine Replication is too slow to be practically useful for high data-rate applications. Asynchronous Virtual Machine Replication, although significantly better than the Synchronous solution, is not directly applicable to high data rate applications, because of the restrictions it imposes on outbound traffic (all transmitted packets need to be buffered for extended periods of time, resulting in significant bandwidth decrease).

Asynchronous replication guarantees that external clients have a consistent view of the replicated system regardless of failures. Primary and backup are only in sync at certain intervals. If all data packet transmissions happen for data packets that were created in the previous time interval, then the consistency is guaranteed, because the previous interval has been successfully committed to the backup.

Because all data packets are buffered in the known asynchronous methods, packets are only transmitted every default time interval (Tepoch), thus reducing effective bandwidth by a factor proportional to the duration of the interval. Further, in the known asynchronous methods, outside clients will experience periods of inactivity during packet buffering followed by brief periods of very high network traffic during buffer release. Therefore, buffering does not preserve the original timing difference between consecutive packets resulting in significant timing distortion (e.g., jitter) in audio and video-related applications. Still further, in the known asynchronous methods a response from the replicated virtual machine will be delayed on average by Tepoch/2.

SUMMARY OF THE INVENTION

The example embodiments relate to time preserving packet transmissions during asynchronous replication of virtual machines.

One embodiment includes a method for replicating a virtual machine. The method includes determining a timestamp corresponding to a received data packet associated with the virtual machine and releasing the data packet from a buffer based on the timestamp and a time another data packet is released from the buffer.

Another embodiment includes a control module associated with a host of a virtual machine. The control module includes a memory configured to buffer data packets, a first module configured to determine a timestamp corresponding to a received data packet associated with the virtual machine, and a second module configured to release the data packet from the memory based on the timestamp and a time another data packet is released from the memory.

Another embodiment includes a network switch. The network switch includes a memory configured to buffer data packets, a first module configured to determine a timestamp corresponding to a received data packet associated with the virtual machine, and a second module configured to release the data packet from the memory based on the timestamp and a time another data packet is released from the memory.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of modules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the tee "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and will be implemented using existing hardware at existing network elements. Such existing hardware will include at least one of one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program/non-transitory storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "client" may be considered synonymous to, and may hereafter be occasionally referred to, as a mobile, mobile unit, mobile station, user equipment, remote station, access terminal, receiver, etc., and may describe a remote user of wired or wireless resources in a communication network.

As used herein, the term "physical machine" may be considered synonymous to, and may hereafter be occasionally referred to, as a server, a network device, a networked computer, etc., and may describe a physical computing device of a wired or wireless communication network and configured to host a virtual machine.

Figure 1:
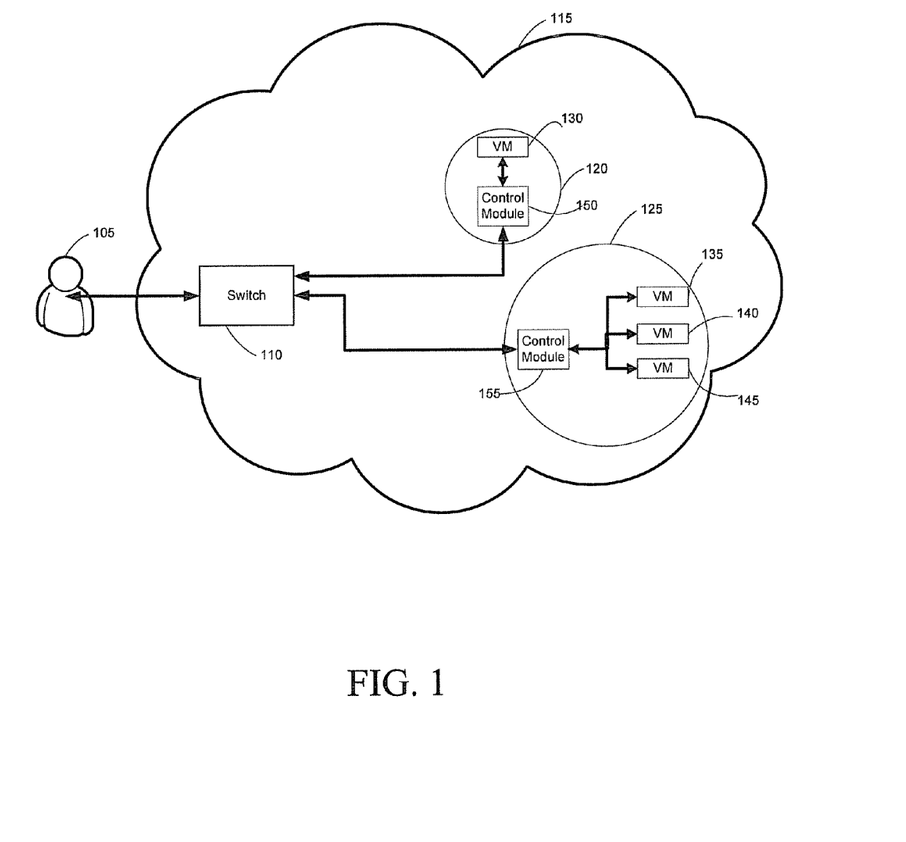
FIG. 1 illustrates a network according to an example embodiment.

FIG. 1 illustrates a network according to an example embodiment. As shown in FIG. 1, a client 105 may be interconnected with a switch 110 (described in more detail with regard to FIG. 3 below). Although only one client is shown, it will be understood that example embodiments are not limited to one client 105. The switch 110 is included in a network environment 115.

The network environment 115 includes one or more physical machines 120, 125. A physical machine 120, 125 may include a control module 150, 155. A physical machine 120, 125 may include one or more virtual machines 130, 135, 140, 145. For example physical machine 120 includes control module 150 and a single virtual machine 130, and physical machine 125 includes control module 155 and three virtual machines 135, 140, 145.

The control modules 150, 155 may be known to one skilled in the art as, for example, a Hypervisor or a Virtual Machine Manager (VMM). The control modules 150, 155 may be configured to host one or more virtual machines 130, 135, 140, 145. The control modules 150, 155 will be discussed in more detail with regard to FIG. 2 below.

As one skilled in the art knows, a virtual machine 130, 135, 140, 145 is a software implementation of a machine that executes software as if the virtual machine 130, 135, 140, 145 were a physical machine. Multiple virtual machines 130, 135, 140, 145 may be executed on a physical machine 120, 125. Similar to how an Operating System may allow multiple programs to run concurrently on a physical machine 120, 125, the control module 150, 155 or Hypervisor may allow multiple virtual machines 130, 135, 140, 145 to run concurrently on a physical machine 120, 125. For the sake of brevity, the general operation of a virtual machine 130, 135, 140, 145 will not be further described.

A network environment 115 is known to those skilled in the art. In general, a network environment 115 will be composed of multiple components (e.g., servers, databases, routers and multiplexers) communicating with each other and functioning to provide services to clients 105. Services include, for example, voice, media, applications, computing resources and the like. Network environment 115 provides flexible computing resources to many clients 105. As one skilled in the art knows, a network environment 115 may be a public network, a private network and/or a hybrid (public/private) network.

Example embodiments provide a timing-preserving transmission buffer associated with an asynchronous virtual machine replicated (e.g., fault tolerant) systems. The timing-preserving buffer transmits the packets while preserving their relative time difference, as determined based on when the packets were originally created, instead of transmitting all the buffered packets at once. Therefore, timing distortion (e.g., jitter) related application quality is not degraded.

Figure 2:
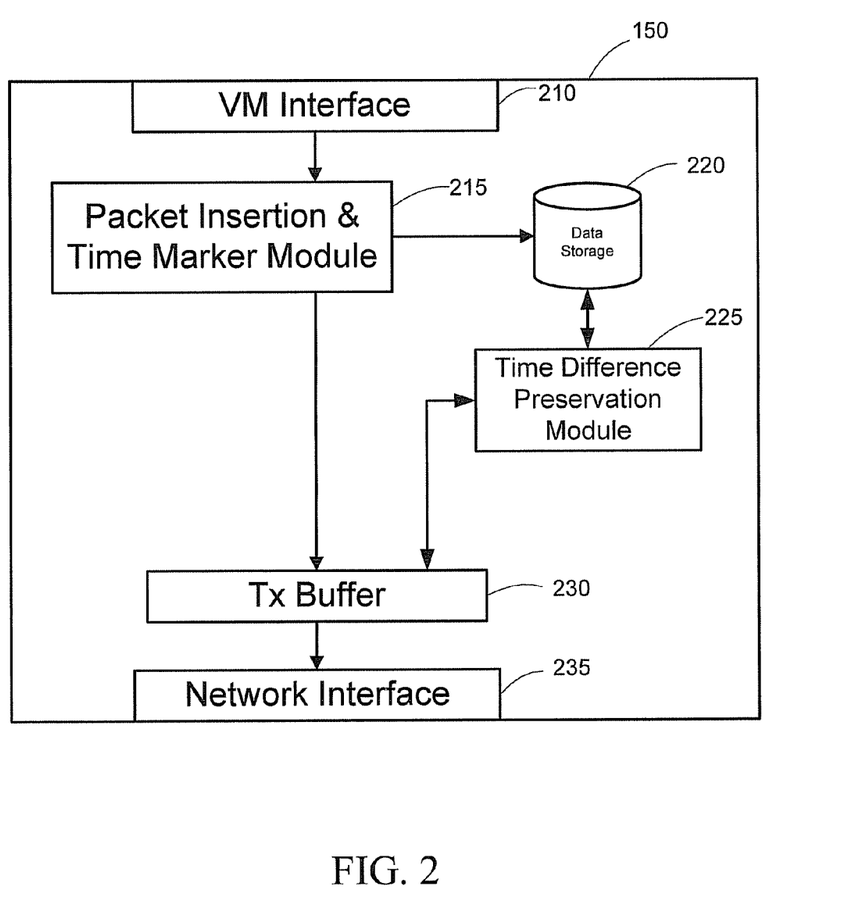
FIG. 2 illustrates a control module according to an example embodiment.

FIG. 2 illustrates a control module 150 according to an example embodiment. As shown in FIG. 2, the control module 150 may include a virtual machine interface 210, a packet insertion and time marker module 215, a memory 220, a time difference preservation module 225, a transmit buffer 230 and a network interface 235. The virtual machine interface 210 functions as an interface for packets and signals transmitted to and received from one or more virtual machines. The network interface 235 functions as an interface for packets and signals transmitted to and received from one or more network elements (e.g., routers, switches, clients, etc.). Interfaces (e.g., virtual machine interface 210 and network interface 235) are known to those skilled in the art and will not be described further for the sake of brevity.

The packet insertion and time marker module 215 may receive, as input, data packets received from the virtual machine interface 210. The packet insertion and time marker module 215 may time stamp the data packets and forward the data packets to the transmit buffer 230. Information regarding the time stamp and the data packet are forwarded to the memory 220 and stored in relation to each other.

The information regarding the time stamp may be a time the data packet is received. For example, the time may be an actual time received, a time relative to a fixed time (e.g., 12:00 am, Jan. 1, 2000), a time relative to a previously received packet, and the like. Although several examples of the time stamp have been listed, example embodiments are not limited thereto. The memory 220 may be a database configured to store the time stamp in relation to an identification number of the packet.

Further, the packet insertion and time marker module 215 may determine if the data packet is to be time stamped. For example, time preservation may not be necessary (or intended) for all network flows. The packet insertion and time marker module 215 may determine to not preserve inter-packet timing for pure data traffic (e.g., a FTP transmission, or a web page download). If time preservation is not necessary, a time stamp may not be associated with the data packet.

For example, the packet insertion and time marker module 215 may make a decision as to whether a data packet is part of a flow which requires timing preservation. If so, the data packet is stored with an associated timestamp (e.g., in data storage 220). If the data packet is not part of a flow which requires timing preservation, the data packet may be sent directly to the transmit buffer 230. There are potentially many ways to make the decision (e.g., look at packet headers to determine protocol being used). There may be correlations between flows to be respected—e.g., a flow carries control commands (play, stop etc.) for flows which are sensitive.

The time difference preservation module 225 may be configured to maintain a relative release time of data packets from the transmit buffer 230. For example, the time difference preservation module 225 may maintain a time difference between received data packets (e.g., data packets received by the virtual machine interface 210) such that the transmit buffer 230 releases data packets in the same order as the data packets are received and with the same difference in time that the data packets are received. Therefore, the network interface 235 may transmit data packets in the same order as the data packets are received and with the same difference in time that the data packets are received.

The time difference preservation module 225 may maintain the time difference between received data packets based on the information regarding the time stamp and the data packet stored in the memory 220. For example, the time difference preservation module 225 may be communicatively coupled with the transmit buffer 230. Therefore, the time difference preservation module 225 may monitor and manage the release, by the transmit buffer 230, of data packets via the coupling.

Figure 3:
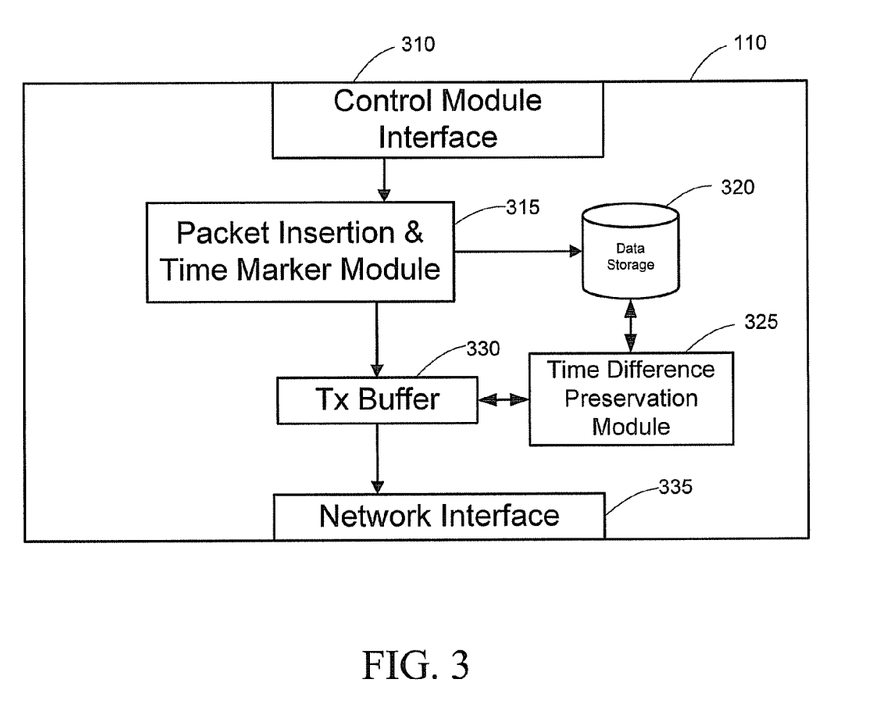
FIG. 3 illustrates a switch according to an example embodiment.

FIG. 3 illustrates a switch 110 according to an example embodiment. As shown in FIG. 3 the switch 110 may include a control module interface 310, a packet insertion and time marker module 315, a memory 320, a time difference preservation module 325, a transmit buffer 330 and a network interface 335. The control module interface 310 functions as an interface for packets and signals transmitted to and received from one or more control modules (e.g., control module 155). The network interface 335 functions as an interface for packets and signals transmitted to and received from one or more network elements (e.g., routers, switches, clients, etc.). Interfaces (e.g., control module interface 310 and network interface 335) are known to those skilled in the art and will not be described further for the sake of brevity.

The packet insertion and time marker module 315 may receive, as input, data packets received from the control module interface 310. The packet insertion and time marker module 215 may time stamp the data packets and forward the data packets to the transmit buffer 330. Information regarding the time stamp and the data packet are forwarded to the memory 320 and stored in relation to each other.

The information regarding the time stamp may be a time the data packet is received. For example, the time may be an actual time received, a time relative to a fixed time (e.g., 12:00 am, Jan. 1, 2000), a time relative to a previously received packet, and the like. Although several examples of the time stamp have been listed, example embodiments are not limited thereto. The memory 320 may be a database configured to store the time stamp in relation to an identification number of the packet.

Further, the packet insertion and time marker module 315 may determine if the data packet is to be time stamped. For example, time preservation may not be necessary (or intended) for all network flows. The packet insertion and time marker module 315 may determine to not preserve inter-packet timing for pure data traffic (e.g., a FTP transmission, or a web page download). If time preservation is not necessary, a time stamp may not be associated with the data packet.

For example, the packet insertion and time marker module 315 may make a decision as to whether a data packet is part of a flow which requires timing preservation. If so, the data packet is stored with an associated timestamp (e.g., in data storage 320). If the data packet is not part of a flow which requires timing preservation, the data packet may be sent directly to the transmit buffer 330. There are potentially many ways to make the decision (e.g., look at packet headers to determine protocol being used). There may be correlations between flows to be respected—e.g., a flow carries control commands (play, stop etc.) for flows which are sensitive.

The time difference preservation module 325 may be configured to maintain a relative release time of data packets from the transmit buffer 330. For example, the time difference preservation module 325 may maintain a time difference between received data packets (e.g., data packets received by the control module interface 310) such that the transmit buffer 330 releases data packets in the same order as the data packets are received and with the same difference in time that the data packets are received. Therefore, the network interface 335 may transmit data packets in the same order as the data packets are received and with the same difference in time that the data packets are received.

The time difference preservation module 325 may maintain the time difference between received data packets based on the information regarding the time stamp and the data packet stored in the memory 320. For example, the time difference preservation module 325 may be communicatively coupled with the transmit buffer 330. Therefore, the time difference preservation module 325 may monitor and manage the release, by the transmit buffer 330, of data packets via the coupling.

A method, according to at least one example embodiment, for operating the control module 150 and/or the switch 110 described above with regard to FIGS. 2 and 3 will be described in more detail below with regard to FIG. 4. Reference will be made to the control module 150 in describing the method of FIG. 4. However, one skilled in the art will recognize the application of the method of FIG. 4 to the switch 110 (or similar structure).

Figure 4:
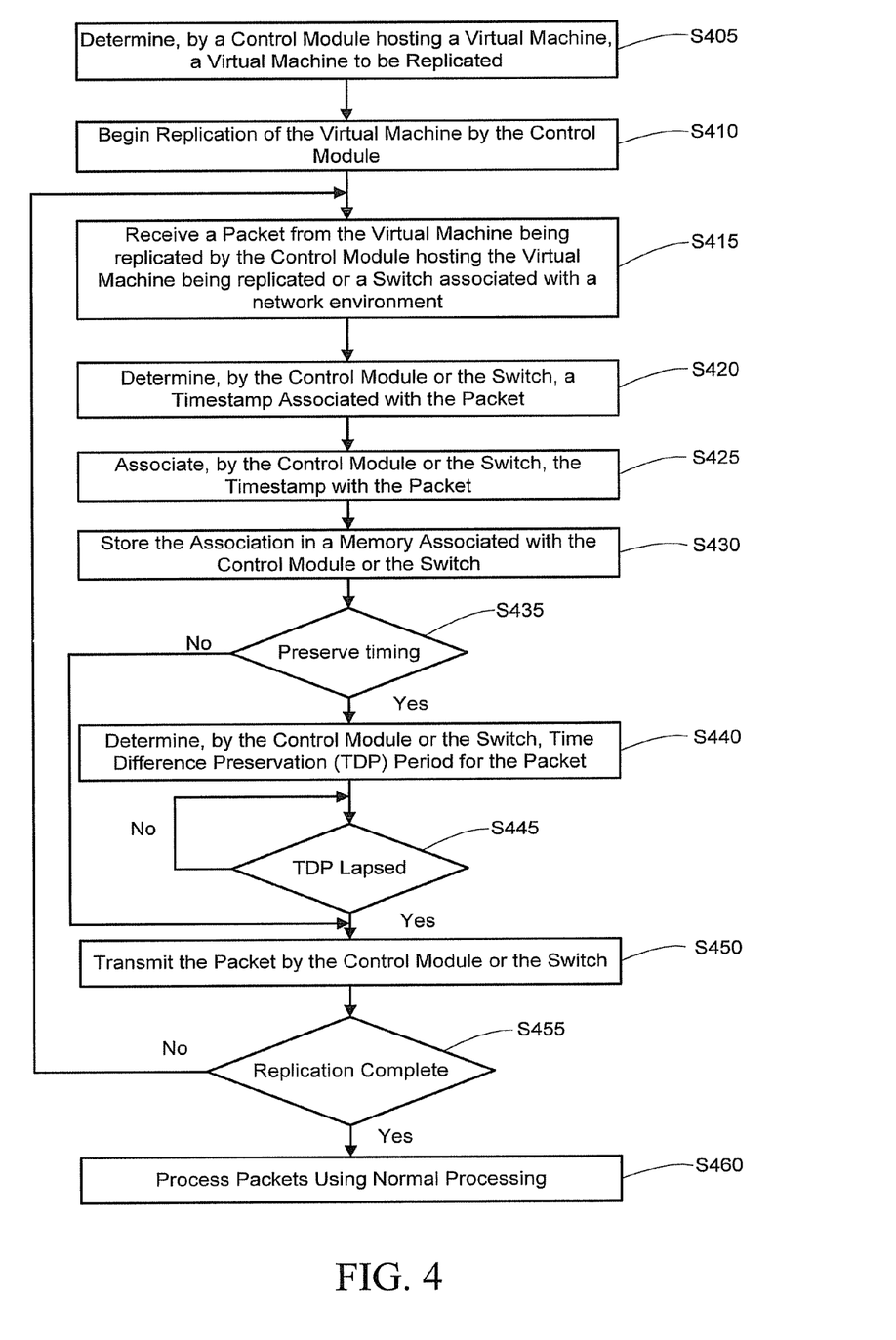
FIG. 4 illustrates a method for asynchronous virtual machine replication including time preserved transmissions according to an example embodiment.

FIG. 4 illustrates a method for asynchronous virtual machine replication according to an example embodiment. While describing the steps of the method associated with FIG. 4, reference will be made to the network of FIG. 1 and the control module 150 of FIG. 2.

Referring to FIG. 4, in step S405 a control module hosting a virtual machine determines the virtual machine is to be replicated. In step S410 the control module begins replication of the virtual machine. Determining a virtual machine is to be replicated and initiating replication of the virtual machine are known to those skilled in the art and will not be described further for the sake of brevity.

In step S415 the control module receives a data packet from the virtual machine being replicated. For example, control module 150 may receive a data packet from virtual machine 130 (assuming virtual machine 130 is the virtual machine being replicated). Control module 150 may receive the data packet via virtual machine interface 210 as shown in FIG. 2. The virtual machine being replicated may generate the data packet and/or receive the data packet.

In step S420 the control module 150 determines a time stamp associated with the data packet. For example, the time stamp may be a time the data packet is received. For example, the time may be an actual time received, a time relative to a fixed time (e.g., 12:00 am, Jan. 1, 2000), a time relative to a previously received packet, and the like. Although several examples of the time stamp have been listed, example embodiments are not limited thereto.

Further, in step S420 the control module 150 may determine if the data packet is to be time stamped. For example, time preservation may not be necessary (or intended) for all network flows. The control module 150 may determine to not preserve inter-packet timing for pure data traffic (e.g., a FTP transmission, or a web page download). If time preservation is not necessary, a time stamp may not be associated with the data packet.

In step S425 the control module 150 associates the time stamp with the data packet. For example, the data packet may have an associated identifier (e.g., packet ID). The control module 150 may generate metadata (e.g., a database entry) associating the associated identifier with the time stamp.

In step S430 the control module 150 stores the association between the time stamp and the data packet. For example, the control module 150 may store the association in memory 220. For example, the control module 150 may store the metadata in memory 220. If memory 220 is a database, the control module 150 may insert a new entry in the database. The new entry may include the packet ID and the time stamp.

In step S435 the control module 150 determines if the data packet is to be time preserved. For example, as is known, during asynchronous virtual machine replication, data packets may only be transmitted every default time interval (Tepoch). At the beginning of the Tepoch associated data packets may be released by the transmit buffer 230 and transmitted by the network interface 235. The associated data packets may be all of the data packets in the transmit buffer 230 or some partial set of the data packets in the transmit buffer 230. If the data packet is not to be time preserved (e.g., no time stamp is associated with the data packet) processing moves to step S450 and the data packet may be released by the transmit buffer 230. Otherwise, the data packet is to be time preserved and processing continues to step S440.

In step S440 the control module 150 determines a time difference preservation (TDP) period for the data packet. For example, the TDP may be a time lapsed since a previous data packet has been transmitted. The TDP may be determined based on the association between the time stamp and the data packet stored in memory 220. For example, the time difference preservation module 225 may monitor data packet transmissions. Before releasing a data packet from the transmit buffer 230, the time difference preservation module 225 may calculate a difference in time between the most recent data packet transmission and the current time.

In step S445, the control module 150 determines if the TDP has lapsed. For example, if a time difference between the most recent data packet transmission time and the current time is less than a time difference between the reception of the recently transmitted data packet and the data packet to be released (e.g., when the data packets were received by the virtual machine interface 210), the data packet to be released is not released by the transmit buffer 230. Otherwise, the data packet to be released is released by the transmit buffer 230. The time difference preservation module 225 may calculate the time differences using the stored time stamp for the data packet to be released. For example, the time difference preservation module 225 may look-up the time stamp in memory 220 using the packet ID for the data packet to be released.

If in step S445, the control module 150 determines the TDP has not lapsed, processing returns to step S445. Otherwise, process continues to step S450.

In step S450, the control module 150 transmits the released data packet. For example, the released data packet may be forwarded to the network interface 235 from the transmit buffer 230. The network interface 235 may transmit the released data packet to one or more network elements (e.g., routers, switches, clients, etc.). Transmission of data packets by the network interface 235 is known to those skilled in the art and will not be described further for the sake of brevity.

In step S455 the control module 150 determines if the replication is complete. If replication is not complete, processing returns to step S415. Otherwise, in step S460 data packets are processed using normal (known) processing. Determining if replication is complete and nor processing of data packets are known to those skilled in the art and will not be described further for the sake of brevity.

Although example embodiments describe a new method (e.g., FIG. 4) including buffering data packets during asynchronous virtual machine replication, example embodiments are not limited thereto. For example, a virtual machine may be replicated to create a backup or standby virtual machine. Data packets associated with the backup or standby virtual machine may be processed using the same methods and using the same apparatus as described above.

For example, the method of FIG. 4 may be performed from the view point of a primary virtual machine and a virtual machine that is a backup of the primary virtual machine. In this example, the virtual machine being replicated becomes the primary virtual machine and step S455 is replaced by questioning whether or not the backup virtual machine continues to be used.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

Example embodiments provide an improved solution for asynchronous replication of a virtual machine because in the known methods data packets are only transmitted every default time interval (Tepoch), thus reducing effective bandwidth by a factor proportional to the duration of the interval. Further, in the known methods outside clients will experience periods of inactivity during packet buffering followed by brief periods of very high network traffic during buffer release. Therefore, in the known methods buffering does not preserve the original timing difference between consecutive packets resulting in significant timing distortion (e.g., jitter) in audio and video-related applications. Still further, in the known methods a response from the replicated virtual machine will be delayed on average by Tepoch/2.

Example embodiments provide a method and apparatus configured to time preserve packet transmissions during asynchronous replication of virtual machines. Therefore, example embodiments preserve the original timing difference between consecutive packets resulting in reduced timing distortion (e.g., jitter) in applications (e.g., audio and video-related applications).

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for time-preserving transmission of data packets associated with replicating a first virtual machine to maintain second virtual machines, the data packets including at least a first data packet and a second data packet, the method comprising:
   receiving, by a network element, the first data packet from the first virtual machine, the first data packet not having an associated timestamp upon receipt;
   receiving, by the network element, the second data packet from the first virtual machine, the second data packet not having an associated timestamp upon receipt; and
   delaying, by the network element, a forwarding of the first data packet and the second data packet to the second virtual machines by,
      determining, by the network element, timestamps for respective ones of the first data packet and the second data packet that indicate when the respective ones of the first data packet and the second data packet were received by the network element;
      first releasing, by the network element the first data packet from a buffer to the second virtual machines; and
      second releasing, by the network element, the second data packet from the buffer to the second virtual machines after the first releasing based on the timestamps such that a time difference between the first releasing and the second releasing is greater than or equal to a time difference between the timestamps.

2. The method of claim 1, further comprising:
   determining, by the network element, an association between the timestamps and the data packets; and
   storing the association in a memory.

3. The method of claim 2, wherein the association associates packet IDs of the data packets and the timestamps.

4. The method of claim 1, wherein the timestamp of the second data packet is determined based on at least one of an actual time the second data packet is received, a time the second data is received relative to a fixed time and a time the second data is received relative to the receiving of the first data packet.

5. A control module associated with a host of a first virtual machine, the control module configured to delay forwarding of data packets from the first virtual machine to second virtual machines that replicate the first virtual machine, the data packets including at least a first data packet and a second data packet, the control module comprising:
- a virtual machine interface configured to,
   - receive the first data packet from the first virtual machine, the first data packet not having an associated timestamp upon receipt, and
   - receive the second data packet from the first virtual machine, the second data packet not having an associated timestamp upon receipt;
- a memory configured to buffer the first data packet and the second data packet;
- a first module configured to determine timestamps for respective ones of the first data packet and the second data packet that indicate when the respective ones of the first data packet and the second data packet were received by the control module; and
- a second module configured to,
   - first release the first data packet from the memory to the second virtual machines, and
   - second release the second data packet from the memory to the second virtual machines after the first releasing based on the timestamps such that a difference in time between the first releasing and the second releasing is greater than or equal to a difference in time between the timestamps.

6. The control module of claim 5, wherein the first module is configured to,
- determine an association between the timestamps and the data packets, and
- store the association in a memory.

7. The control module of claim 6, wherein the association associates packet IDs of the data packets and the timestamps.

8. The control module of claim 5, wherein the first module determines the timestamp of the second data packet based on at least one of an actual time the second data packet is received, a time the second data is received relative to a fixed time and a time the second data is received relative to the receiving of the first data packet.

9. A network switch configured to delay forwarding of data packets from a first virtual machine to second virtual machines that replicate the first virtual machine, the data packets including at least a first data packet and a second data packet, the network switch comprising:
- a control module interface configured to,
   - receive the first data packet from the first virtual machine, the first data packet not having an associated timestamp upon receipt, and
   - receive the second data packet from the first virtual machine, the second data packet not having an associated timestamp upon receipt;
- a memory configured to buffer the first data packet and the second data packet;
- a first module configured to determine timestamps for respective ones of the first data packet and the second data packet that indicate when the respective ones of the first data packet and the second data packet were received by the control module; and
- a second module configured to,
   - first release the first data packet from the memory to the second virtual machines, and
   - second release the second data packet from the memory to the second virtual machines after the first releasing based on the timestamps such that a difference in time between the first releasing and the second releasing is greater than or equal to a difference in time between the timestamps.

10. The network switch of claim 9, wherein the first module is configured to,
- determine an association between the timestamps and the data packets, and
- store the association in a memory.

11. The network switch of claim 10, wherein the association associates packet IDs of the data packets and the timestamps.

12. The network switch of claim 9, wherein the first module determines the timestamp of the second data packet based on at least one of an actual time the second data packet is received, a time the second data is received relative to a fixed time and a time the second data is received relative to the receiving of the first data packet.

* * * * *